July 8, 1924.

P. R. STEVENSON 1,500,777

PERMANENT TEST AND PRACTICE FORM

Filed Feb. 10, 1922      2 Sheets-Sheet 1

Paul R. Stevenson
INVENTOR.

BY

Edwin P. Corbett
ATTORNEY.

July 8, 1924.

P. R. STEVENSON

PERMANENT TEST AND PRACTICE FORM

Filed Feb. 10, 1922     2 Sheets-Sheet 2

1,500,777

Paul R. Stevenson
INVENTOR.

BY

Edwin P. Corbett
ATTORNEY.

Patented July 8, 1924.

1,500,777

UNITED STATES PATENT OFFICE.

PAUL R. STEVENSON, OF COLUMBUS, OHIO.

PERMANENT TEST AND PRACTICE FORM.

Application filed February 10, 1922. Serial No. 535,481.

*To all whom it may concern:*

Be it known that I, PAUL R. STEVENSON, a citizen of the United States of America, residing at Columbus, in the county of Franklin and State of Ohio, have invented certain new and useful Improvements in Permanent Test and Practice Forms, of which the following is a specification.

My invention relates to permanent test and practice forms and has to do with the provision of a novel exercise form to be used for test or practice exercises in educational subjects, in vocational and industrial guidance, or in intelligence or moral examinations, et cetera.

In the past, in the use of printed material for tests or practice exercises, it has been the custom to use a printed form or booklet, each page having a list of exercises with a proper space for writing the answers thereon. Upon completion of this test or practice exercise by the student, it has been necessary for the instructor or student to check these separate answers on each separate page, thus making the correction or checking of each form or booklet a very tedious and lengthy task. In case the completed booklet is to be saved, or filed, it has been necessary to file the entire booklet, with all the pages thereof, thus making it very bulky. Furthermore, in the use of such booklet in either practice or test exercises, regardless of the question of saving such completed records, the cost of supplying a new booklet for each pupil for each new test or practice exercise has been almost prohibitive.

My device is of a very simple and inexpensive, but permanent, structure and comprises a structure and pages of such design as to allow the printed material therein to be used many times instead of requiring new material for each individual tested.

More specifically, my invention comprises a device which is preferably in the form of a booklet. The cover of the booklet is of standard design and is adapted to receive a blank sheet upon which the answers to the enclosed exercises may be written. The printed sheets or cards, containing the test or practice exercises, may be each of a different size or may contain a series of pages, a certain number of which may be of the same shape and size.

One of the objects of my invention is the provision of a novel practice or exercise form, of a material that may be used practically continuously, and for as many different students or individuals as desired.

Another important object of my device is the provision of a permanent cover with a series of pages, each series of pages being of a different size than its adjacent series of pages, and each page containing a list of exercises, the answers to each series of exercises on each different sized page being designed to be placed on a single pad or sheet of paper.

Another object of my invention has to do with the provision of an answer booklet consisting of a series of pages corresponding in size to similar pages in the test or practice exercise booklet, each similar page of the answer booklet containing the correct answers to the corresponding exercises of the practice or test booklet, and means positioned on the cover of the answer booklet designed to receive the single page containing the written answers to the exercises whereby each page of the answer booklet is designed to register with the answers on the single sheet, corresponding to the exercises on the similar page of the exercise booklet. For example, an individual may write the answer to each exercise on the different pages on a single sheet secured on or slipped over the cover of the booklet. The result is that this page containing the written answers may be removed, the booklet given to another individual or student, and the removed page secured to the cover of the answer booklet and each answer checked by merely turning over the successive pages which register with the answers thereon. This obviously results in a great saving of expensive printed material, time expended by the student in practice exercises, and time expended by the instructor in checking such answer exercises or tests.

A still further object of my invention has to do with the provision of means for securing the answer sheets to the exercise or test booklet. This means is of such a nature that this sheet is held securely and in a definite relation to each page of the answer booklet and to the corresponding pages in the answer booklet, thus, making it impossible to change the position of the answer page relative to the page of the booklet either during the answering or checking operation.

Various other features of my invention will be apparent as this description progresses and will be brought out in the claims appended thereto. The various objects of my invention are preferably attained by the structure illustrated in the drawings wherein similar characters of reference designate corresponding parts and wherein—

Figures 1, 2:
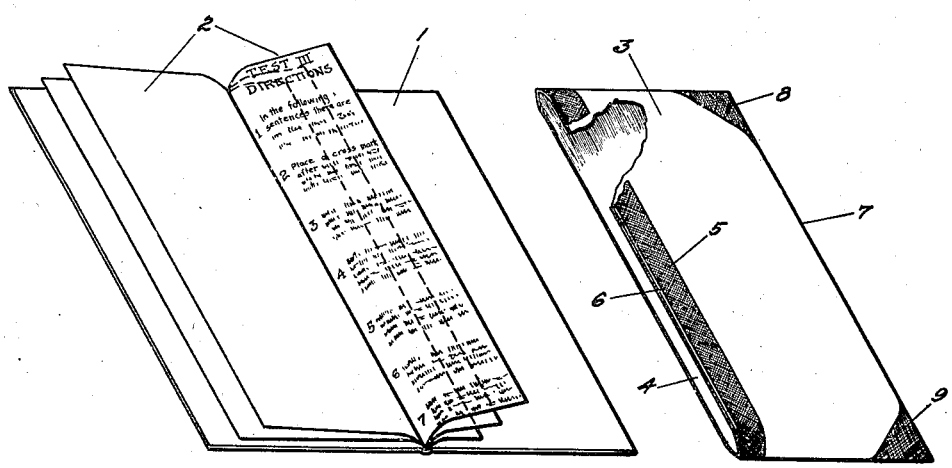
Figure 1 is a perspective view of my permanent test and practice exercise booklet, illustrating the different sized sheets therein and one form of printed exercises on one sheet.
Figure 2 is a perspective view of my blank sheet envelope designed to slip over the cover of the device shown in Figure 1.
Figure 3:
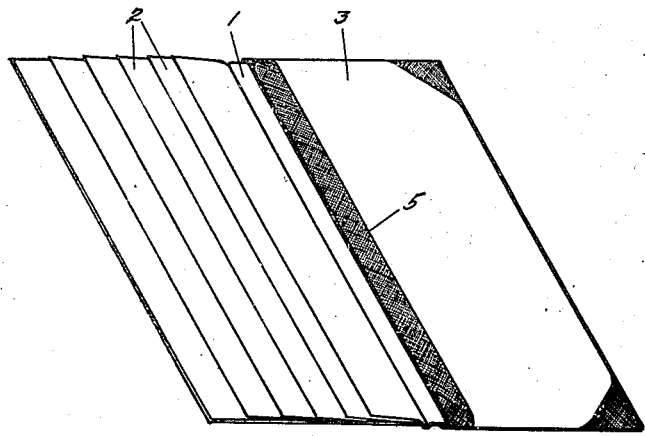
Figure 3 is a perspective view of the structure shown in Figure 1 with the envelope shown in Figure 2 applied thereto.

In the drawings, my device is shown as comprising a permanent form or booklet, the cover of which may be designated 1. This booklet is preferably made up of a series of pages 2 of different widths, some of the pages being substantially a separate series in that they are of the same width. Thus, it will be apparent from the drawings that the pages of the booklet may comprise a series of pages, each series having pages of a different size than the adjacent series of pages.

Designed to slip over the cover 1, is an envelope-shaped cover 3. This envelope is preferably made of card-board, cloth, or other material, bound on three sides and leaving the fourth side 4 open. Adapted to be secured to the upper edge of the opening 4, I have provided a strip of cloth or other suitable material, one edge 5 of which is loose, and the other edge 6 of which is secured to the upper edge of the envelope. On the opposite edge 7 of the envelope, and at the two corners thereof, I have provided triangular corner caps 8 and 9, designed to receive and secure a sheet of paper or card-board.

Figure 4:
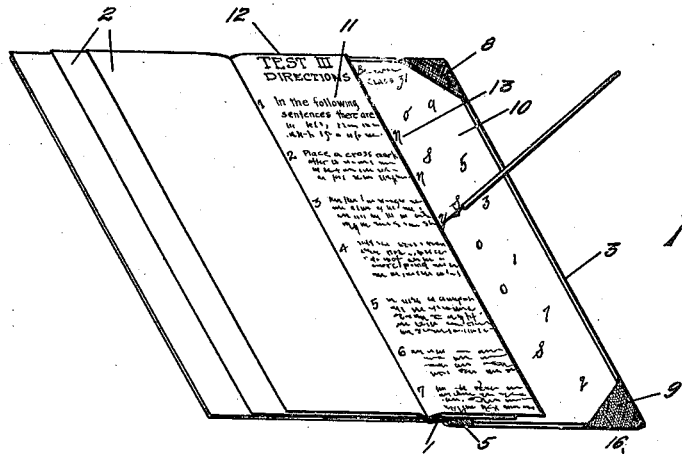
Figure 4 is a detail perspective view of the structure shown in Figure 3, showing a blank sheet inserted in the envelope and the manner of writing answers to the list of exercises contained on the various sheets.

Referring particularly to Figure 4, it will be understood that a sheet of blank paper, card-board or other material 10 is secured to the envelope 3 by inserting it under the corner caps 8 and 9 and under the binding strip 5. As each of the pages 2 is adapted to receive a list of questions or exercises, and as the different series of pages are of a different size, it will be apparent that the answers to the exercises on each successive sheet, of a different width, may be written on the blank sheet 10 and just to the edge of the printed sheet 2. More specifically, the exercises 11, on one of the pages 12, may be answered by the pupil or individual by writing the answers 13 on the blank sheet 10, near the edge of the exercise sheet 12 and opposite the question in particular. It will also be apparent that the page 12 may be a series of pages substantially of the same size, and the rest of the pages 2 likewise arranged, the result being that a certain kind or nature of exercise may be printed on the different size sheets corresponding to the sheet 12, and exercises of a different nature may be printed on the other sheets of the same size in each series. Thus, it will be possible to insert one blank sheet 10 to receive the answers of one series of exercise sheets, each sheet being of a different form and then to insert a second sheet 10 to receive the answers to a second series of exercises, pages of this second series being of the same size as those of the first series.

Figure 5:
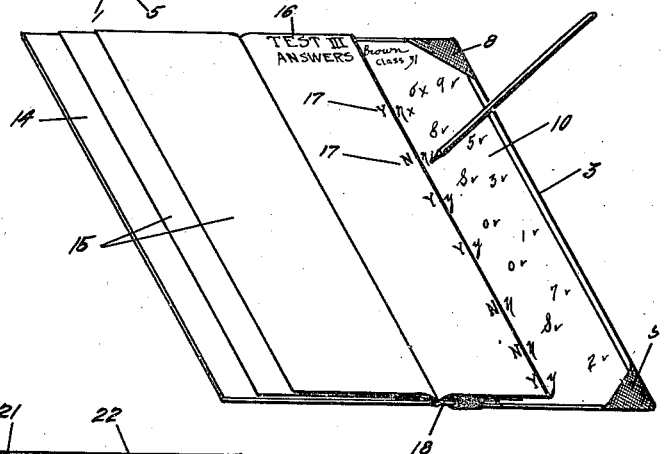
Figure 5 is a detail perspective view similar to the structure shown in Figure 4 and showing the envelope attached to the answer booklet and illustrating the manner of checking answers by means of the correct answers on the various pages of the answer booklet.

A second form or booklet 14 (shown in Figure 5) is similar in structure to the exercise booklet shown in Figures 1 and 4. All of the pages 15, of the booklet 14, are of the same size as the corresponding pages 2 of the exercise booklet, the answers to the exercises on the pages 2 being printed on the edge of each of the pages 15 in place of the original exercises. For example, the page 16 of the answer booklet 14 is designed to correspond with page 12 of the exercise booklet, and the correct answers 17 are placed on the edge of the page 16 in place of the exercises 11. Thus, in checking up the written answers on the blank sheet 10, it is only necessary to remove the envelope 3, insert it over the cover 18 of the booklet 14 and check the written answers on this blank sheet with the registering answers 17 on the pages 15 and 16.

In the use of the permanent test and practice form, as shown in Figures 1 to 4, the permanent form of exercises, registering with a blank sheet of paper 10, is handed to the individual to be tested. The answer to each of the exercises, on the different size papers, may be written adjacent the edge of each page, and on the secured sheet 10. When this blank sheet of paper is taken out, another sheet of paper may be inserted in the envelope 3. All that is needed for each additional individual tested, is a blank sheet of paper and the printed matter may be used until worn out. In correcting the answers to the tests written on the blank sheet 10, it is only necessary to remove the blank sheet 10, or the envelope 3, and secure this blank sheet or envelope to the cover of the answer booklet 14, corresponding to the exercise booklet used. The answers being printed on the edge of each printed page corresponding to the printed exercise page of the exercise booklet, these correct answers will register with each respective written answer on the sheet 10.

Figure 6:
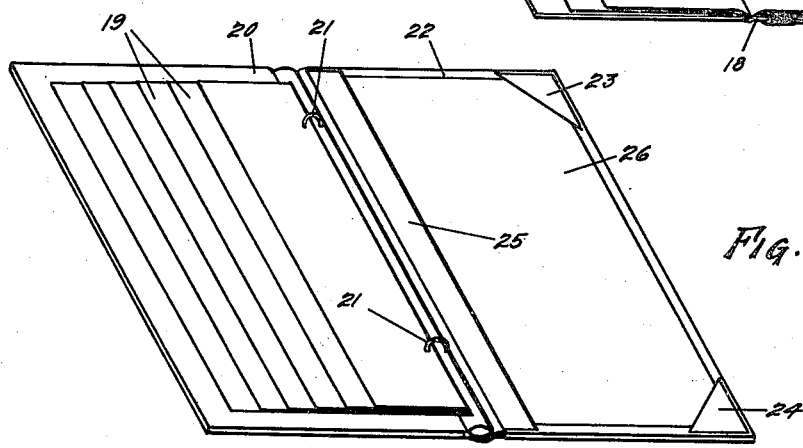
Figure 6 is a perspective view of a modified form of my device and showing the method of using loose leaves instead of permanent attached leaves.

A modified form of my test and practice device is shown in Figure 6. This device is such as to permit of the use of loose leaves 19 in place of the permanent leaves 2, as shown in Figure 4. In this form, a loose-leaf note book 20 with its binding posts 21 is utilized to receive the standard punched sheets 19. The cover 22 is provided with corner caps 23 and 24 at its outer edge and with a binding strip 25 at its inner edge. The binding strip 25 and the corner caps 23 and 24 are similar to the binding strip and cap shown in Figures 2 and 4 and are also designed to receive a positively secured and blank sheet of paper 26. It will also be obvious that the blank sheet 26 may be punched to fit the binding posts 21.

Manifestly, the loose leaves 19, as shown in Figure 6, may be permanently secured to the cover or binder 20 or, similarly, the cover 1, as shown in Figure 1, may be provided with a binder and corner caps similar to those used in Figures 2 and 6.

It will be seen that I have provided a novel and simple form for test and practice exercises. It will not only save a great deal of time in all practice and test exercises and examinations, but will much more greatly reduce the cost of such forms in comparison with the present methods.

It will be obvious, particularly for practice exercise purposes, that each series of pages 2 may contain an unlimited number of additional pages of equal size, whereby the student may use a blank sheet for one series of exercises and then insert an additional blank sheet 10 or 26 for each additional series of exercises.

It will further be understood that the different size sheets or series of sheets may be not only of different widths but also of different lengths, with the result that the answers thereto may be written at the bottom or top thereof as would be convenient in accordance with the nature of the exercises.

Obviously, my invention may take many different forms, in that I may change the general design and shape in accordance with the nature of the test or practice exercises. All such changes, however, are within the scope of the appended claims.

Having thus described my invention, what I claim is:

1. In a device of the character described, a permanent form comprising a list of exercises, a permanent form comprising answers to said exercises and a means engageable with either of said forms, said means being adapted to receive the written answers to questions of the first-named form and to register said written answers with the correct answers of the second form.

2. In a device of the character described, a permanent form comprising a cover, a series of different sized leaves, and a means for receiving answers designed to slip over one side of said cover.

3. In a device of the character described, a cover, and a series of leaves designed to be inserted in said cover, each series of leaves being of a different size than its adjacent series of leaves and containing a series of exercises and one side of said cover being designed to receive a blank sheet of paper substantially larger than the largest of said leaves.

4. In a device of the character described, a cover, and a series of leaves designed to be inserted in said cover, each series of leaves being of a different size than its adjacent series of leaves and one side of said cover being designed to receive a blank sheet of paper substantially larger than the largest of said leaves.

5. In a device of the character described, a form containing a list of exercises and a blank sheet for receiving answers to said exercises adapted to be held in place by engagement with one of the leaves of said form.

6. In a device of the character described, a form comprising a list of exercises, a removable sheet for receiving the written answers to said exercises, and a means engageable with said form and adapted to receive said sheet.

7. In a device of the character described, a sheet for receiving answers to a list of exercises, a form containing the correct answers to said exercises, said sheet being designed to be inserted in said form, the pages and correct answers in the form registering with the corresponding answers on the sheet.

8. In a device of the character described, a permanent form comprising a series of leaves secured thereto and a means removably applicable to said form for receiving notations corresponding to material contained on said leaves.

9. In a device of the character described, a permanent form comprising exercises secured thereto and a single means for receiving answers to all of said exercises.

10. In a device of the character described, a permanent form comprising a plurality of leaves secured thereto, exercises on each leaf, and a single means for receiving answers to all of said exercises.

11. In a device of the character described, a permanent form comprising a plurality of leaves secured thereto, exercises on said leaves, a single means for receiving answers to said exercises, so formed that all of said answers may be written on said means and at points adjacent the edges of said leaves.

12. In a device of the character described, a permanent form comprising a plurality of leaves, exercises secured thereto on said leaves and means for receiving answers to said exercises, said answers to be placed on said means and at points adjacent the edges of said leaves.

13. In a device of the character described, a series of leaves of varying sizes, exercises on said leaves, and means for receiving the answers to said exercises, said leaves being so arranged that the answers to the exercises on each leaf may be placed on said means adjacent the edge of said leaf.

14. In a device of the character described, a series of leaves of varying sizes, exercises on said leaves, and means for receiving the answers to said exercises, said leaves being so arranged that the answers to the exercises on each leaf may be placed on said means adjacent the edge of said leaf, the exercises on the other leaves being obscured during this operation.

15. In a device of the character described, a series of leaves containing exercises, means for receiving the answers to said exercises, and means engageable with said first-named means and registering with all the answers thereon for checking said answers.

16. In a device of the character described, a series of leaves containing exercises, means for receiving the answers to said exercises, said answers being written adjacent the edges of said leaves, and means engageable with said first-named means and registering with all the answers thereon for checking said answers.

17. In a device of the character described, a permanent form containing exercises secured thereto, and means for receiving the answers to said exercises, so formed that all of said answers may be written on said means adjacent the edge of said form.

18. In a device of the character described, a permanent form comprising different sized leaves, exercises on said leaves and a means adapted to be overlapped to different extents by said leaves for receiving the answers to said exercises.

19. In a device of the character described, a permanent form comprising a cover, a series of different sized leaves, and a means for receiving answers designed to slip over one side of said cover and adapted to be overlapped to different extents by said leaves.

In testimony whereof I hereby affix my signature.

PAUL R. STEVENSON.